United States Patent
Nakamura (10) Patent No.: US 11,451,697 B2
(45) Date of Patent: Sep. 20, 2022

(54) CAMERA SYSTEM, CONTROLLER THEREOF, AUTOMOBILE, AND DESERIALIZER CIRCUIT

(71) Applicant: ROHM CO., LTD., Kyoto (JP)

(72) Inventor: Kenya Nakamura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/117,740

(22) Filed: Dec. 10, 2020

(65) Prior Publication Data

US 2021/0099628 A1 Apr. 1, 2021

Related U.S. Application Data

(63) Continuation of application No. PCT/JP2019/019321, filed on May 15, 2019.

(30) Foreign Application Priority Data

Jun. 12, 2018 (JP) .............................. JP2018-111984

(51) Int. Cl.
H04N 7/18 (2006.01)
H04N 5/232 (2006.01)
H04N 5/04 (2006.01)

(52) U.S. Cl.
CPC ............... *H04N 5/232* (2013.01); *H04N 5/04* (2013.01); *H04N 7/181* (2013.01)

(58) Field of Classification Search
CPC .......... H04N 5/232; H04N 5/04; H04N 7/181; H04N 7/18; H04N 21/43; H04N 5/247

(Continued)

(56) References Cited

U.S. PATENT DOCUMENTS 8,982,219 B2 * 3/2015 Tsubaki ............. H04N 21/2187
348/192
9,041,813 B1 * 5/2015 Yakay .................... H04N 5/126
348/159

(Continued)

FOREIGN PATENT DOCUMENTS

CN 1897463 A 1/2007
CN 102116643 A 7/2011

(Continued)

OTHER PUBLICATIONS

International Search Report for International Application No. PCT/JP2019/019321; dated Jul. 30, 2019.

(Continued)

*Primary Examiner* — Trang U Tran
(74) *Attorney, Agent, or Firm* — Cantor Colburn LLP (57) ABSTRACT

A controller controls multiple camera modules, and processes video images captured by the multiple camera modules. The controller is configured: (i) to output a frame synchronization signal FSYNC to each of the multiple camera modules; (ii) to receive frame data and a transmission synchronization signal SYNC that is synchronized with the frame data; (iii) to process the multiple items of frame data thus received; and (iv) to acquire a time difference between the corresponding frame synchronization signal and the corresponding transmission synchronization signal for each camera module, so as to adjust the timing of the frame synchronization signal according to the time difference.

8 Claims, 7 Drawing Sheets

(58) Field of Classification Search
USPC .................................................. 348/148, 192
See application file for complete search history.

(56) References Cited

U.S. PATENT DOCUMENTS

| | | | | |
|---|---|---|---|---|
| 9,544,492 | B2* | 1/2017 | Zhang | .................... H04N 5/247 |
| 10,721,517 | B2* | 7/2020 | Wu | .................... H04N 21/2368 |
| 2014/0350836 | A1* | 11/2014 | Stettner | .................... G01S 7/489 |
| | | | | 701/301 |

FOREIGN PATENT DOCUMENTS

| | | |
|---|---|---|
| CN | 102474656 A | 5/2012 |
| CN | 104918003 A | 9/2015 |
| CN | 105340266 A | 2/2016 |
| JP | H04268883 A | 9/1992 |
| JP | 2007259120 A | 10/2007 |
| JP | 2011234341 A | 11/2011 |
| JP | 2012138671 A | 7/2012 |
| JP | 2015165628 A | 9/2015 |

OTHER PUBLICATIONS

PCT International Preliminary Report on Patentability with Written Opinion of the International Searching Authority for International Application No. PCT/JP2019/019321; dated Dec. 24, 2020.
CNIPA First Office Action corresponding to CN Application No. 201980030766.5; dated Jun. 23, 2021.
JPO Notice of Reasons for Refusal for corresponding JP Application No. 2020-525358; dated Jan. 4, 2022.

* cited by examiner

CAMERA SYSTEM, CONTROLLER THEREOF, AUTOMOBILE, AND DESERIALIZER CIRCUIT

CROSS REFERENCE TO PRIOR APPLICATIONS

This application is a continuation under 35 U.S.C. § 120 of PCT/JP2019/019321, filed May 15, 2019, which is incorporated herein reference and which claimed priority to Japanese Application No. 2018-111984, filed Jun. 12, 2018. The present application likewise claims priority under 35 U.S.C. § 119 to Japanese Application No. 2018-111984, filed Jun. 12, 2018, the entire content of which is also incorporated herein by reference.

BACKGROUND

1. Technical Field

The present disclosure relates to a data transmission technique.

2. Background Art

A camera system configured to process video images captured by multiple cameras and to display a processed image is employed for an in-vehicle around view monitor or the like.

Figure 1:
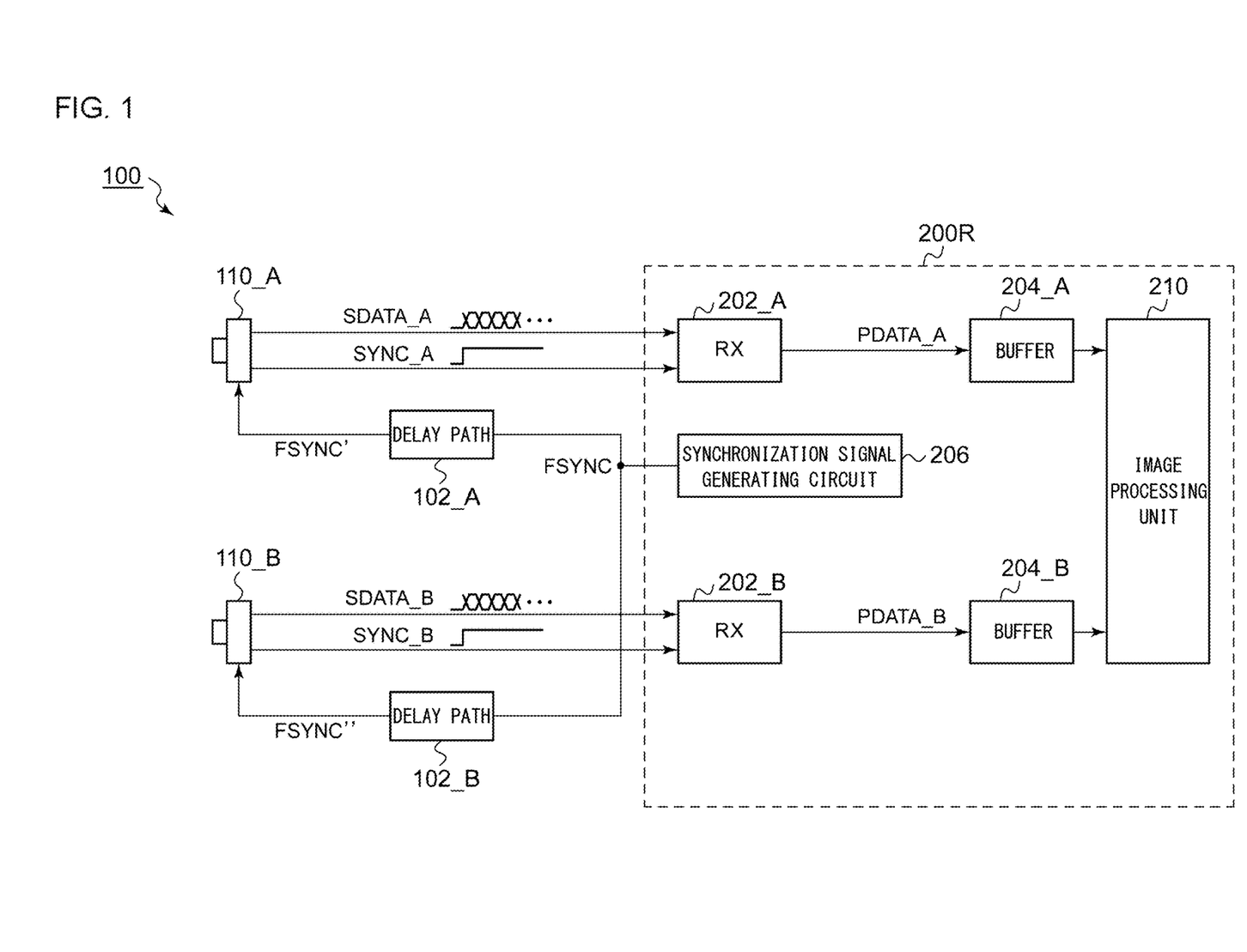
FIG. 1 is a block diagram showing a camera system.

FIG. 1 is a block diagram showing a camera system. A camera system 100R includes multiple camera modules 110 (two in this example), and a controller 200R. The controller 200R integrally controls the multiple camera modules 110_A and 110_B, and processes video images captured by the multiple camera modules 110_A and 110B.

The controller 200R includes multiple receivers 202, multiple buffers 204, a synchronization signal generating unit 206, and an image processing unit 210, The synchronization signal generating unit 206 generates a frame synchronization signal FSYNC that is asserted at a predetermined frame rate, and supplies the frame synchronization signal FSYNC thus generated to the multiple camera modules 110 # ("#" represents "A" or "B"). The camera module 110_# captures an image at a timing that corresponds to the frame synchronization signal FSYNC. The camera module 110 # converts the frame data thus captured into serial data SDATA #, and transmits the serial data SDATA_# to the controller 200R.

The receiver 202_# receives the serial data SDATA_# that composes the frame data received from the corresponding camera module 110_# together with a transmission synchronization signal SYNC_#. The serial data SDATA_# thus received is converted into parallel data PDATA_#. The parallel data PDATA_# thus converted is stored in the buffer 204_# in units of multiple pixels or in units of multiple lines. The image processing unit 210 processes the image data stored in the multiple buffers 204_A and 204_B.

As a result of investigating the camera system 100R shown in FIG. 1, the present inventor has recognized the following problem. That is to say, in some cases, there is a difference between a delay path 102_A that couples the synchronization signal generating unit 206 and the camera module 110_A and a delay path 102_B that couples the synchronization signal generating unit 206 and the camera module 110_B. In this case, there is a difference between the frame synchronization signal FSYNC' input to the camera module 110_A and the frame synchronization signal FSYNC" input to the camera module 110_B in the timing at which the frame synchronization signal is received.

In this case, deviation occurs in the image capture timing between the camera modules 110_A and 110_B. This leads to the occurrence of deviation in the frame data receiving timing between the serial data SDATA_A received by the receiver 202_A and the serial data SDATA_B received by the receiver 202_B.

For example, in a case in which the image processing unit 210 integrates the frame data received from the camera module 110_A and the frame data received from the camera module 110_B so as to generate a signal image, such an arrangement has a problem in that there is a difference in updating timing between regions in a single image.

In order to solve this problem, such an arrangement requires the buffers 204_A and 204_B to have an increased capacity so as to absorb the difference in the timing at which the frame data arrives between multiple items of frame data. However, in a case in which each buffer 204 is configured to have an increased capacity, this leads to a problem of an increased area and an increased cost of the controller 200R.

SUMMARY

The present disclosure has been made in view of such a situation.

One embodiment of the present disclosure relates to a camera system. The camera system includes: multiple camera modules; and a controller structured to control the multiple camera modules, and to process video images captured by the multiple camera modules. The controller is structured: (i) to output a frame synchronization signal to each of the multiple camera modules; (ii) to receive frame data and a transmission synchronization signal that is synchronized with the frame data from each of the multiple camera modules; (iii) to process the multiple items of frame data thus received; and (iv) to acquire a time difference between the corresponding frame synchronization signal and the corresponding transmission synchronization signal for each camera module, so as to adjust the frame synchronization signal according to the time difference.

One embodiment relates to a controller structured to control multiple camera modules, and to process video images captured by the multiple camera modules. The controller includes: multiple receivers each structured to receive frame data and a transmission synchronization signal that is synchronized with the frame data from the corresponding camera module; an image processing unit structured to process multiple items of frame data received by the multiple receivers; a synchronization signal generating unit structured to generate multiple frame synchronization signals that correspond to the multiple camera modules; multiple delay measurement units each structured to acquire a time difference between the corresponding frame synchronization signal and the corresponding transmission synchronization signal; and multiple transmitters structured to transmit the multiple frame synchronization signals to the multiple camera modules. The multiple frame synchronization signals have a timing relation that is adjustable based on the time differences measured by the multiple delay measurement units.

One embodiment relates to a deserializer. The deserializer circuit is structured to receive a video image captured by a camera module. The deserializer circuit includes: a receiver structured to receive frame data and a transmission synchronization signal that is synchronized with the frame data from the camera module; a transmitter structured to transmit a frame synchronization signal received from an external circuit to the camera module; and a delay measurement unit structured to acquire a time difference between the frame synchronization signal and the transmission synchronization signal.

It should be noted that any combination of the components described above or any manifestation according to the present disclosure, may be mutually substituted between a method, apparatus, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

1. Overview of the Embodiments

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment relates to a camera system. The camera system includes: multiple camera modules; and a controller structured to control the multiple camera modules, and to process video images captured by the multiple camera modules. The controller is structured: (i) to output a frame synchronization signal to each of the multiple camera modules; (ii) to receive frame data and a transmission synchronization signal that is synchronized with the frame data from each of the multiple camera modules; (iii) to process the multiple items of frame data thus received; and (iv) to acquire a time difference between the corresponding frame synchronization signal and the corresponding transmission synchronization signal for each camera module, so as to adjust the frame synchronization signal according to the time difference.

The transmission synchronization signal indicates the leading position of frame data (or the leading position of line data), and has a correlation with an image capture timing of the camera module. Accordingly, the controller measures the time difference in the timing between the frame synchronization signal transmitted by the controller itself and the returning transmission synchronization signal so as to align the time difference for all the camera modules, thereby aliening the image capture timing.

In one embodiment, the controller may include: multiple receivers each structured to receive frame data and a transmission synchronization signal that is synchronized with the frame data from the corresponding camera module; an image processing unit structured to process multiple items of frame data received by the multiple receivers; a synchronization signal generating unit structured to generate multiple frame synchronization signals that correspond to the multiple camera modules; multiple delay measurement units each structured to acquire a time difference between the corresponding frame synchronization signal and the corresponding transmission synchronization signal; and multiple transmitters structured to transmit the multiple frame synchronization signals to the multiple camera modules. Also, the multiple frame synchronization signals may have a timing relation that is adjustable based on the time differences measured by the multiple delay measurement units.

In one embodiment, the receiver, the transmitter, and the delay measurement unit that correspond to the same camera module may be integrated on a single deserializer circuit.

In one embodiment, the camera module may include: an image sensor; and a serializer circuit structured to enable bidirectional communication with the deserializer circuit that forms a pair with the serializer circuit.

One embodiment relates to a controller structured to control multiple camera modules, and to process video images captured by the multiple camera modules. The controller includes: multiple receivers each structured to receive frame data and a transmission synchronization signal that is synchronized with the frame data from the corresponding camera module; an image processing unit structured to process multiple items of frame data received by the multiple receivers; a synchronization signal generating unit structured to generate multiple frame synchronization signals that correspond to the multiple camera modules; multiple delay measurement units each structured to acquire a time difference between the corresponding frame synchronization signal and the corresponding transmission synchronization signal; and multiple transmitters structured to transmit the multiple frame synchronization signals to the multiple camera modules. The multiple frame synchronization signals have a timing relation that is adjustable based on the time differences measured by the multiple delay measurement units.

In one embodiment, the receiver, the transmitter, and the delay measurement unit that correspond to the same camera module may be integrated on a single deserializer circuit.

One embodiment relates to a deserializer circuit structured to receive a video image captured by a camera module. The deserializer circuit includes: a receiver structured to receive frame data and a transmission synchronization signal that is synchronized with the frame data from the camera module; a transmitter structured to transmit a frame synchronization signal received from an external circuit to the camera module; and a delay measurement unit structured to acquire a time difference between the frame synchronization signal and the transmission synchronization signal.

With the deserializer circuit further including an additional circuit component structured to measure the difference in the timing between the frame synchronization signal and the returning transmission synchronization signal, this enables acquisition of data for aligning image capture timings without a need for a large change of the other hardware components.

In one embodiment, the deserializer circuit may further include a delay circuit that applies a delay to the frame synchronization signal. The delay may be adjustable according to the time difference. This allows necessary processing for aligning image capture timings to be fully supported by means of an internal component of the deserializer circuit.

In one embodiment, the deserializer circuit may be configured to allow the time difference to be output to an external circuit. In this case, such an external circuit of the deserializer circuit may execute a part of the necessary processing for aligning the image capture timings.

2. Embodiments

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 2:
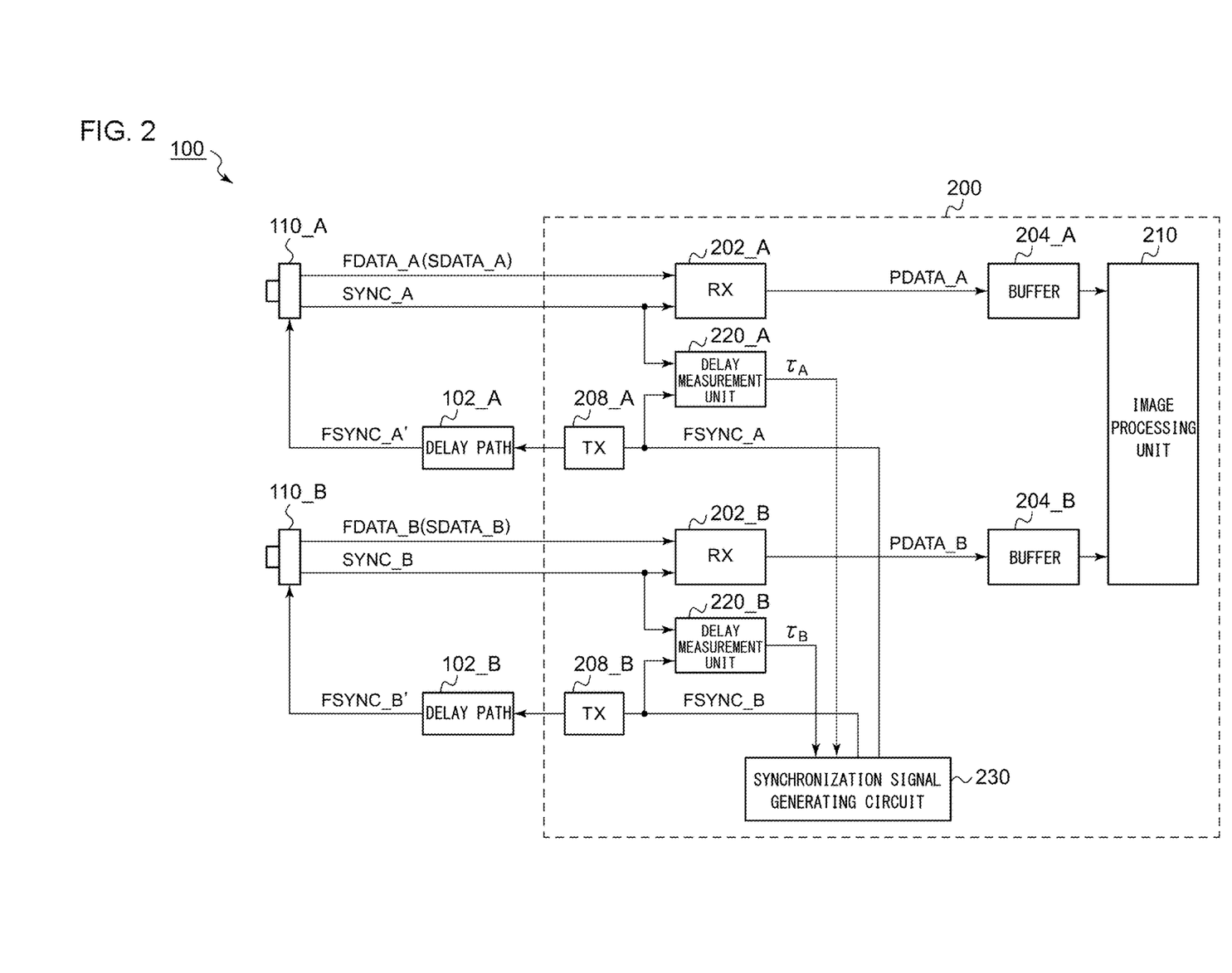
FIG. 2 is a block diagram showing a camera system including a controller according to an embodiment.

FIG. 2 is a block diagram showing a camera system 100 including a controller 200 according to an embodiment. The camera system 100 has the same basic configuration as that of the camera system 100R shown in FIG. 1. The camera system 100 includes multiple camera modules 110_A and 110B, and a controller 200. The controller 200 integrally controls the multiple camera modules 110_A and 110_B, and processes video images captured by the camera modules 110_A and 110_B. For simplification of description and ease of understanding, description will be made in the present embodiment regarding an example including two camera modules 110. Also, the number of the camera modules may be three or more. In such a case, "#" corresponds to "A", "B", "C", The controller 200 is configured to have the following functions (i) through (iV). The method for implementing such functions is not restricted in particular.

Function (i)

The controller 200 outputs separate frame synchronization signals FSYNC_A and FSYNC_B to the multiple camera modules 110_A and 110_B, respectively. That is to say, unlike the controller 200R shown in FIG. 1, the controller 200 is configured to be capable of supplying the frame synchronization signal FSYNC_# to the multiple camera modules 110_A and 110_B at different timings (or at the same timing).

The camera module 110_# captures an image at a timing that corresponds to the corresponding frame synchronization signal FSYNC_#. The camera module 110_# converts the frame data FDATA_# thus captured into serial data SDATA_#, and transmits the serial data SDATA_# thus converted to the controller 200.

Function (ii)

The controller 200 receives the frame data FDATA_# and the transmission synchronization signal SYNC_# which is synchronized with the frame data FDATA_# from each of the multiple camera modules 110_A and 110_B. As the transmission synchronization signal SYNC_#, any one from among a data enable signal DE, horizontal synchronization signal HS, and vertical synchronization signal VS may be employed, as with typical image interfaces.

Function (iii)

The controller 200 processes the multiple items of frame data FDATA_# thus received. The content of the processing supported by the controller 200 is not restricted in particular. For example, the controller 200 may integrate the multiple items of frame data FDATA_# so as to generate a single frame. Also, the controller 200 may select one item from among the multiple items of frame data FDATA_#.

The controller 200 is configured to (iv) acquire the time difference $\tau_\#$ between the corresponding frame synchronization signal FSYNC_# and the corresponding transmission synchronization signal SYNC_#. The controller 200 is configured to be capable of adjusting the timing of the frame synchronization signal FSYNC_# according to the time difference $\tau_\#$.

The above is the function of the controller 200. Next, description will be made regarding an example configuration of the controller 200. The controller 200 includes multiple receivers 202, multiple buffers 204, multiple transmitters 208, an image processing unit 210, multiple delay measurement units 220, and a synchronization signal generating unit 230.

The receiver 202_# receives the serial data SDATA_# that composes the frame data FDATA_# output form the corresponding camera module 110_# together with the transmission synchronization signal SYNC_#. The serial data SDATA_# thus received is converted into parallel data PDATA_#, and is stored in the buffer 204_# in units of multiple pixels or in units of multiple lines. The image processing unit 210 processes the image data stored in the multiple buffers 204_A and 204_B.

The synchronization signal generating unit 230 generates the multiple frame synchronization signals FSYNC_A and FSYNC_B that correspond to the multiple camera modules 110_A and 110_B. The multiple frame synchronization signals FSYNC_A and FSYNC_B are each configured with an adjustable timing.

The transmitter 208_# transmits the corresponding frame synchronization signal FSYNC_# to the corresponding camera module 110_#.

The delay measurement unit 220_# acquires the time difference $\tau_\#$ between the corresponding frame synchronization signal FSYNC_# and the corresponding transmission synchronization signal SYNC_#.

The synchronization signal generating unit 230 is configured to be capable of adjusting the timing relation between the multiple frame synchronization signals FSYNC_A and FSYNC_B based on the time differences $\tau_A$ and $\tau_B$ measured by the multiple delay measurement units 220_A and 220_B.

The above is the configuration of the controller 200. Next, description will be made regarding the operation of the camera system 100.

Figure 3A:
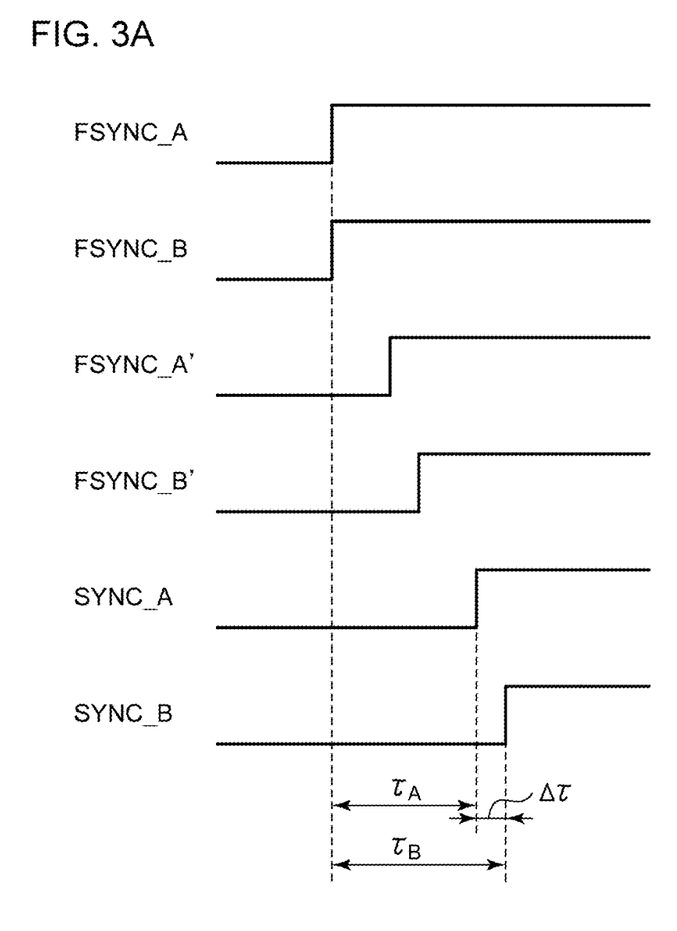
FIG. 3A and FIG. 3B are time charts for explaining a calibration operation of the camera system shown in FIG. 2.
Figure 3B:
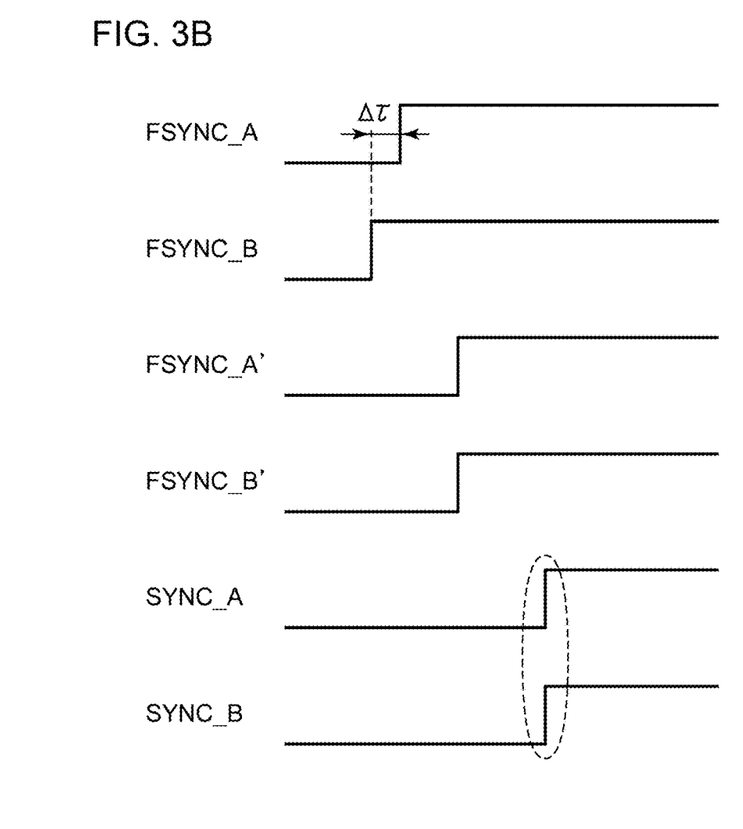

FIG. 3A and FIG. 3B are time charts for explaining a calibration operation of the camera system 100 shown in FIG. 2. As shown in FIG. 3A, first, the synchronization signal generating unit 230 supplies the multiple frame synchronization signals FSYNC_A and FSYNC_B to the camera modules 110_A and 110_B with an aligned timing.

As a result, the frame synchronization signals FSYNC_A and FSYNC_B reach the camera module 110_A and 110_B via different delay paths 102_A and 102_B, respectively. After the frame synchronization signals respectively reach the camera modules 110_A and 110_B, the frame synchronization signals will be represented by "FSYNC_A'" and "FSYNC_B'".

The camera module 110_# captures an image in response to the corresponding synchronization signal FSYNC#', and transmits the serial data SDATA # that composes the frame data FDATA_# to the controller 200 together with the transmission synchronization signal SYNC_#.

In the controller 200, the delay measurement unit 220 # measures the difference $\tau_\#$ between the corresponding frame synchronization signal FSYNC_# and the transmission synchronization signal SYNC_#. The time differences TA and TB are supplied to the synchronization signal generating unit 230. The synchronization signal generating unit 230 adjusts the timings of the frame synchronization signals FSYNC_A and FSYNC_B based on the time differences TA and TB so as to align the timing of the transmission synchronization signals SYNC A and SYNC B.

The timings may be adjusted with the channel that involves a large time difference $\tau$ as a reference. In the example shown in FIG. 3A, the channel B involves the largest delay $\tau$. In this case, the deference in the delay amount $\Delta\tau=(\tau_B-\tau_A)$ may be calculated. As shown in FIG. 3B, the timing of the frame synchronization signal FSYNC_A of the other channel (channel A in this example) may be delayed by $\Delta\tau$.

Conversely, the timings may be adjusted with the channel involving a small time difference $\tau$ as a reference. In the example shown in FIG. 3A, the channel A involves the smallest delay. In this case, the difference in the delay amount $\Delta\tau=(\tau_B-\tau_A)$ may be calculated. Also, the timing of the frame synchronization signal FSYNC_B of the other channel (channel B in this example) may be advanced by $\Delta\tau$.

Figure 4A:
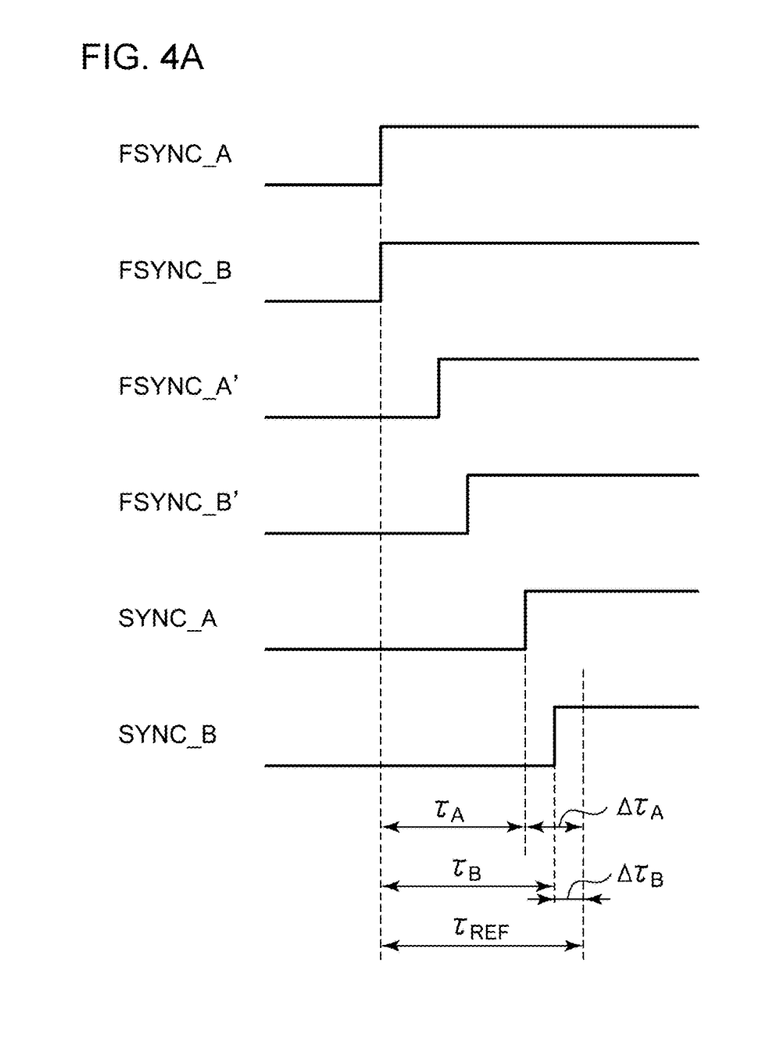
FIG. 4A and FIG. 4B are time charts for explaining another calibration operation.
Figure 4B:
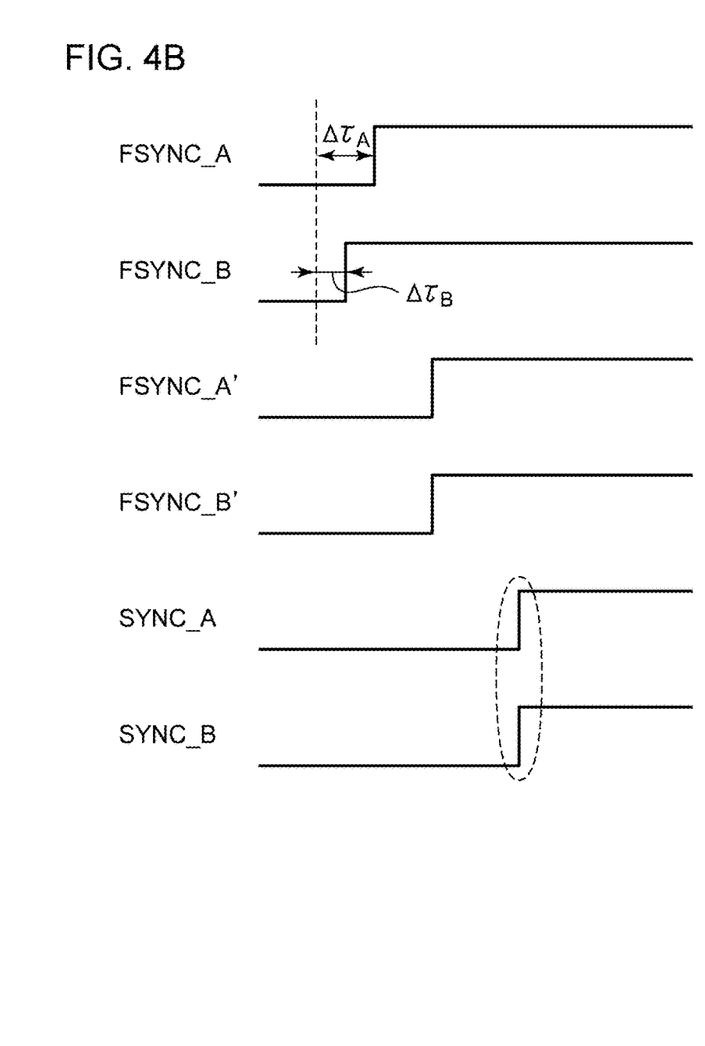

FIG. 4A and FIG. 4B are time charts each showing another calibration operation. In this example, the timing of the frame synchronization signal of each channel is adjusted using a common reference value $\tau_{REF}$ defined for all the channels. Specifically, the difference $\Delta\tau_\#$ between the reference value $\tau_{REF}$ and the measured delay amount $\tau_\#$, i.e., $\Delta\tau_\#=(\tau_{REF}-\tau_\#)$ is calculated. The timing of FSYNC_# is adjusted according to $\Delta\tau_\#$.

The above is the operation of the camera system 100. Next, description will be made regarding the advantage thereof. The transmission synchronization signal SYNC indicates the leading position of each frame data FDATA (or leading position of each line), and has a correlation with the image capture timing provided by the camera module 110. Accordingly, the controller 200 measures the timing difference $\tau_\#$ between the timing of the frame synchronization signal FSYNC_# transmitted by the controller 200 itself and the returning transmission synchronization signal SYNC_#. Furthermore, the controller 200 aligns the time differences $\tau_\#$ for all the camera modules. This provides alignment of the image capture timing.

By aligning the timing at which the frame data FDATA captured by each of the multiple camera modules 110 reaches the controller 200, the camera system 100 requires no additional buffer for absorbing the time difference. That is to say, this allows the buffers 204_A and 204_B to each have a small capacity, thereby allowing the circuit area and cost to be reduced.

The present disclosure encompasses various kinds of apparatuses and methods that can be regarded as a block configuration or a circuit configuration shown in FIG. 2, or otherwise that can be derived from the aforementioned description. That is to say, the present disclosure is not restricted to a specific configuration. More specific description will be made below regarding an example configuration or an example for clarification and ease of understanding of the essence of the present disclosure and the circuit operation. That is to say, the following description will by no means be intended to restrict the technical scope of the present disclosure.

Figure 5:
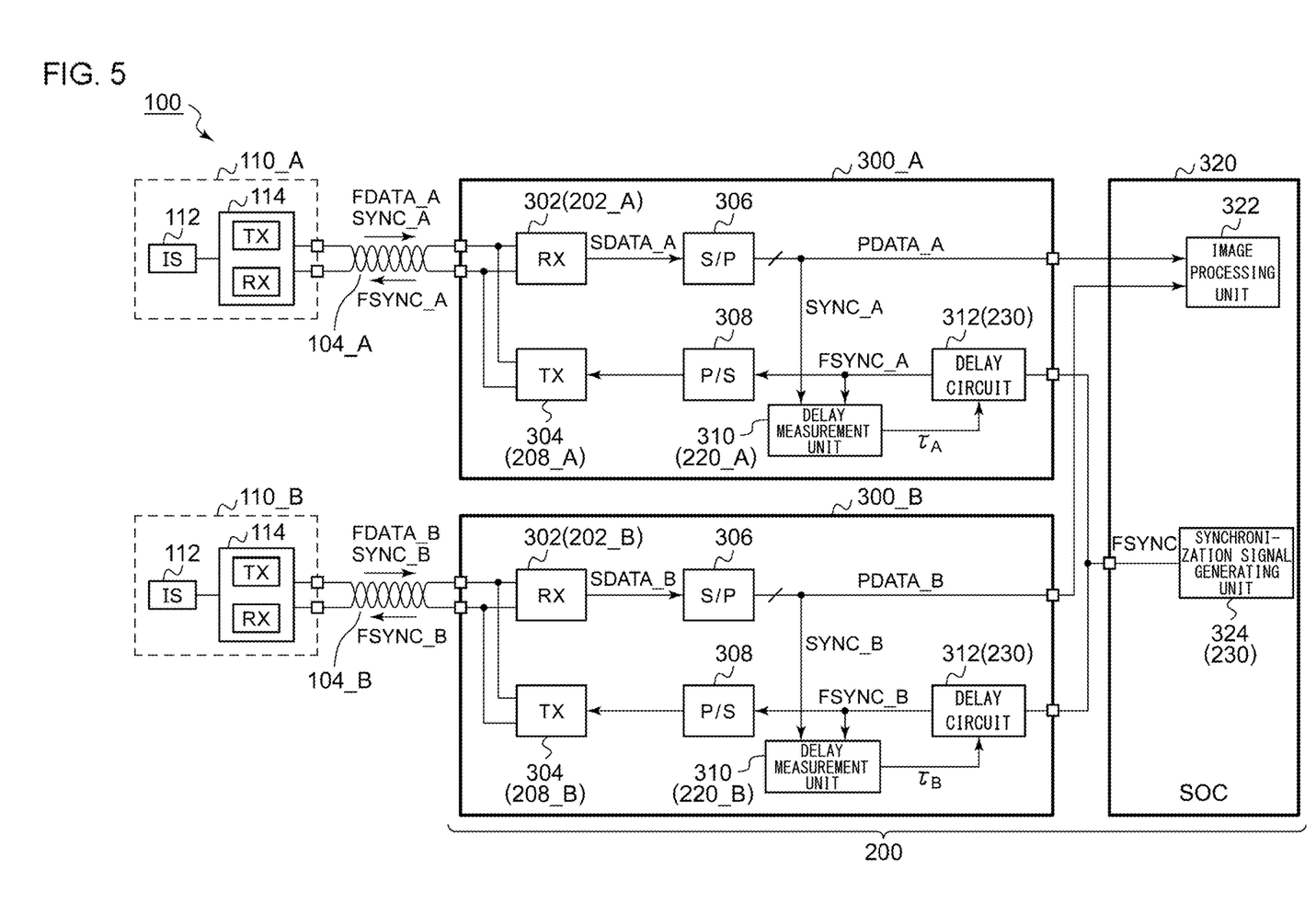
FIG. 5 is a block diagram showing a controller according to an embodiment.

FIG. 5 is a block diagram showing the controller 200 according to an example. The reference numerals that correspond to those shown in FIG. 2 are noted in brackets. In a case in which there is a long distance, e.g., several meters, between each camera module 110 and the controller 200, it is difficult for an interface built into a general-purpose microcontroller or processor to transmit large-volume image data. In order to solve such a problem, a set of a serializer circuit and a deserializer circuit is employed so as to support long-distance transmission.

The controller 200 includes deserializer circuits 300 # each provided to the corresponding channel, and a processor 320 such as a System On Chip (SOC) or the like. On the other hand, each camera module 110_# includes an image sensor 112 and a serializer circuit 114. The serializer circuit 114 and the deserializer circuit 300 are coupled via a differential transmission path 104. This arrangement enables bidirectional serial data transmission via the single differential transmission path 104.

Each receiver 202 #, each transmitter 208_#, and each delay measurement unit 220_#, which correspond to the corresponding camera module 110_# shown in FIG. 2, are integrated on a single deserializer circuit 300_# shown in FIG. 5. Specifically, the deserializer circuit 300 includes a receiver 302, a transmitter 304, a serial/parallel converter 306, a parallel/serial converter 308, a delay measurement unit 310, and a delay circuit 312.

The receiver 302 receives serial data transmitted from the serializer circuit 114. The serial data SDATA may include the frame data FDATA and the transmission synchronization signal SYNC described above. It should be noted that the transmission synchronization signal SYNC may be transmitted via a dedicated signal line that differs from the differential transmission path 104.

The serial/parallel converter 306 converts the serial data SDATA received by the receiver 302 into parallel data PDATA. The parallel data PDATA includes the frame data FDATA and the transmission synchronization signal SYNC.

The processor 320 includes an image processing unit 322 and a synchronization signal generating unit 324. The synchronization signal generating unit 324 generates a common frame synchronization signal FSYNC for all the camera modules 110_A and 110_B. The frame synchronization signal FSYNC is supplied to each of the multiple deserializer circuits 300_A and 300_B. The image processing unit 322 receives the frame data FDATA_A and FDATA_B respectively received by the deserializer circuits 300_A and 300_B, and processes the frame data FDATA_A and FDATA_B thus received.

The delay circuit 312 is capable of setting a delay time. The delay circuit 312 delays the frame synchronization signal FSYNC received from the processor 320 so as to generate the frame synchronization signal FSYNC_# for each channel. The parallel/serial converter 308 converts the frame synchronization signal FSYNC_# into serial data. The transmitter 304 drives the differential transmission path 104 according to the serial data output from the parallel/serial converter 308, so as to transmit the frame synchronization signal FSYNC_# to the camera module 110.

The delay measurement unit 310 measures the time difference (delay) $\tau_\#$ between the frame synchronization signal FSYNC_# and the transmission synchronization signal SYNC_#. The delay amount provided by the delay circuit 312 is set based on the time difference $\tau_\#$ measured by the delay measurement unit 310.

Figure 6:
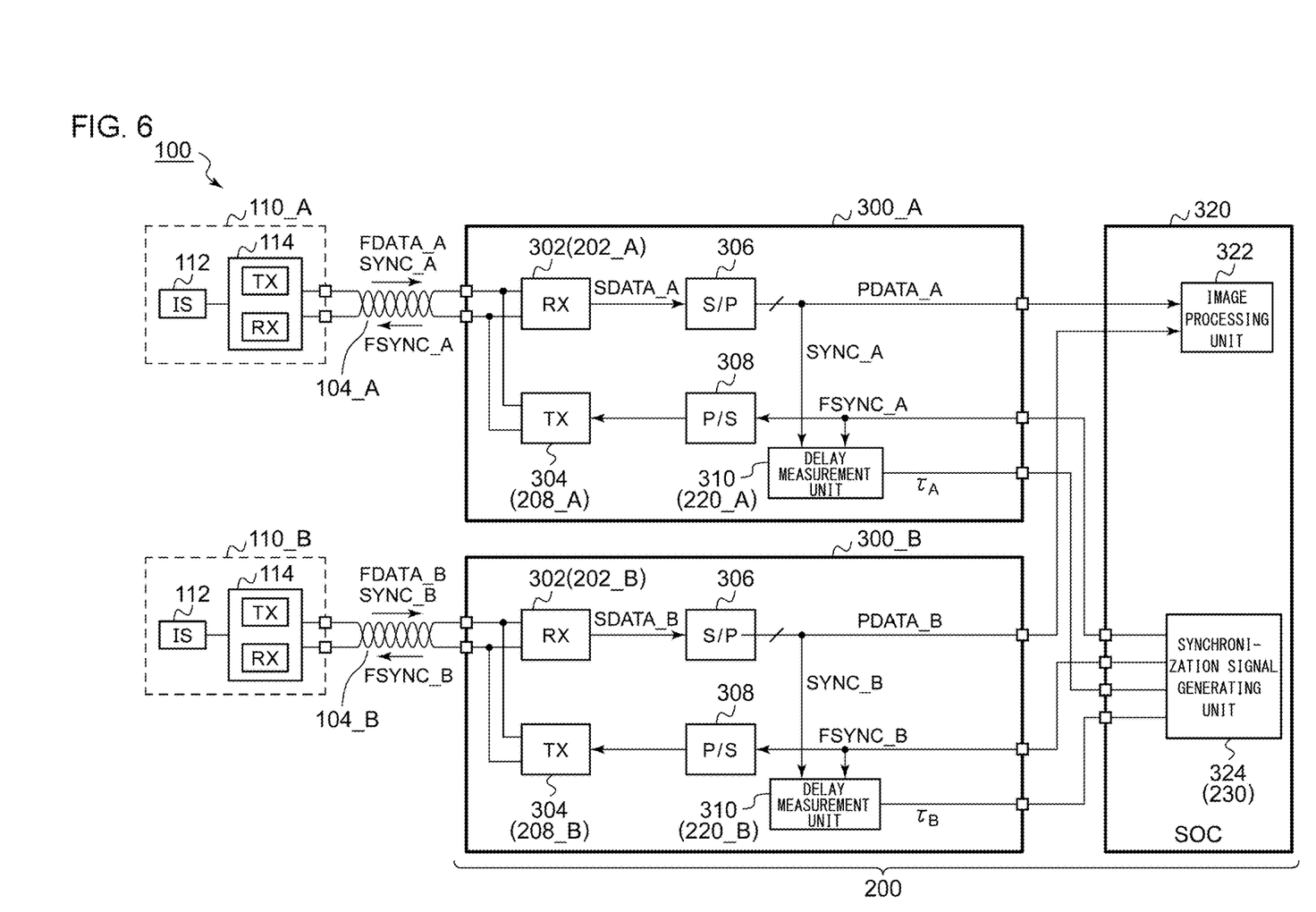
FIG. 6 is a block diagram showing a controller according to an embodiment.

FIG. 6 is a block diagram showing the controller 200 according to an example. Description will be made regarding only the difference from an arrangement shown in FIG. 5. In the example shown in FIG. 6, the synchronization signal generating unit 324 generates the frame synchronization signals FSYNC_A and FSYNC_B for the respective channels, and supplies the frame synchronization signals FSYNC_A and FSYNC_B to deserializer circuits 300_A and 300B, respectively. That is to say, the function of the delay circuit 312 shown in FIG. 5 is integrated in the synchronization signal generating unit 324 shown in FIG. 6.

The deserializer circuit 300 # is configured to be capable of supplying the time difference $\tau_\#$ measured by the delay measurement unit 310 to the processor 320. The time difference $\tau_\#$ may be supplied to the processor 320 via a register access-type interface such as an Inter IC (I²C) interface, Serial Peripheral Interface (SPI), or the like. Alternatively, the time difference $\tau_\#$ may be supplied to the processor 320 via a common signal line shared by the parallel data PDATA_#. The synchronization signal generating unit 324 adjusts the timings of the frame synchronization signals FSYNC_A and FSYNC_B based on the time differences $\tau_A$ and $\tau_B$.

Figure 7:
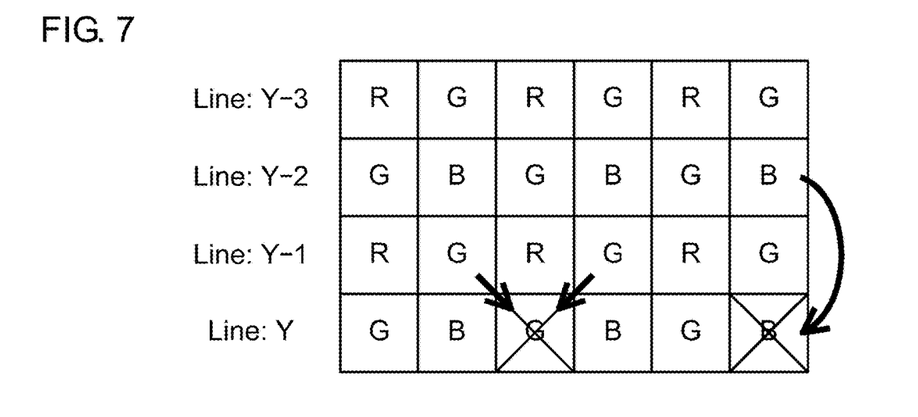
FIG. 7 is a diagram for explaining RAW data generated by an image sensor and error correction.

Next, description will be made regarding correction of a transmission error that occurs in the transmission of frame data from the camera module 110 to the controller 200. In many cases, the image sensors employ a Bayer array. FIG. 7 is a diagram for explaining RAW data generated by the image sensor and error correction. Here, "R", "G", and "B" represent subpixels of "red", "green", and "blue", respectively. In many cases, such an image sensor outputs RAW data without demosaicing processing. Accordingly, with the camera system 100, in some cases, the frame data FDATA transmitted from the camera module 110 to the controller 200 is configured as such RAW data in a Bayer array format before demosaicing, instead of RGB data for each pixel subjected to demosaicing.

In the controller 200 shown in FIG. 2, the buffer 204 has a data capacity of three lines of RAW data. Upon detecting the occurrence of an error in a subpixel of "G" of a given line Y, the image processing unit 210 uses the data of a subpixel of "G" of the immediately previous line Y-1 as a substitution. There are two subpixels of "G" that are closest to each subpixel of "G". Accordingly, an average value of the two closest subpixels may be employed.

Upon detecting the occurrence of an error in a subpixel of "R" or "B" of a given line Y, the image processing unit 210 uses the data of the closest subpixel of "R" or "B" included in the two-lines-previous line Y-2 as a substitution.

This arrangement is capable of suppressing degradation of an image due to the occurrence of an error in the RAW data transmission.

Figure 8:
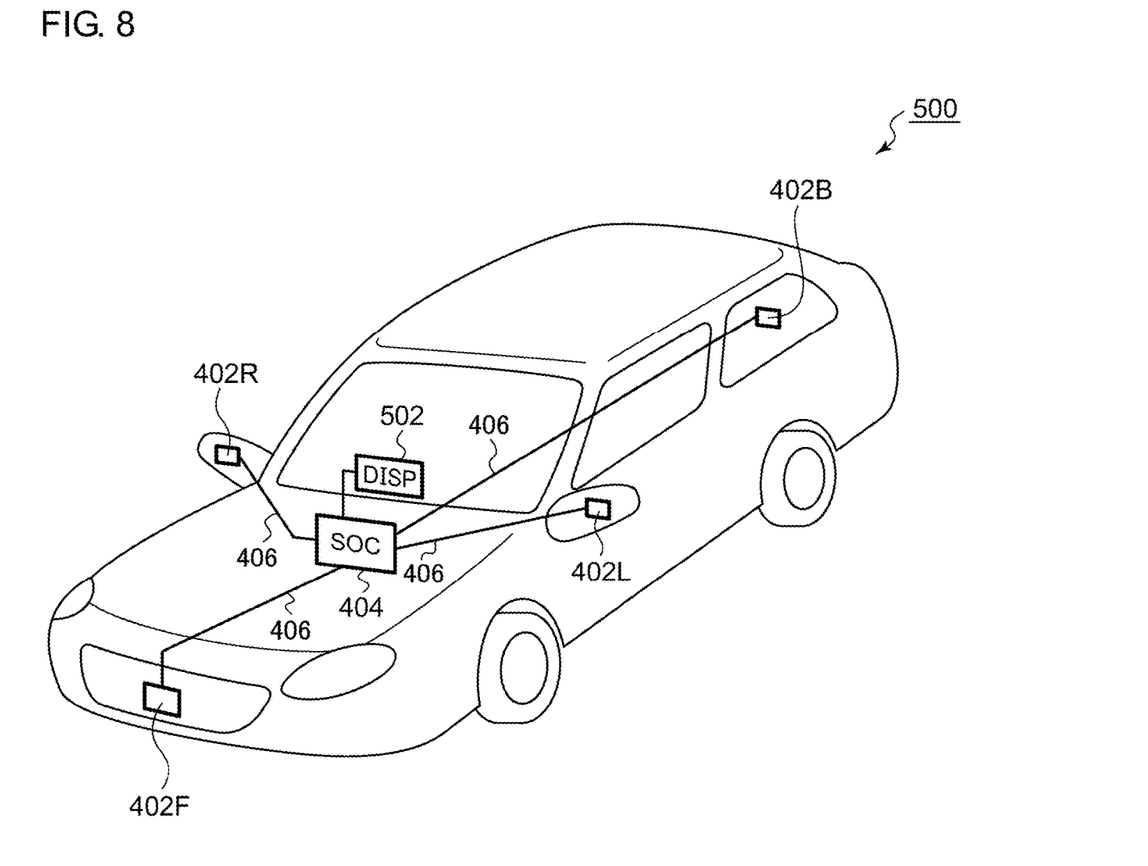
FIG. 8 is a diagram showing an automobile including a camera system.

Next, description will be made regarding the usage of the camera system 100. FIG. 8 is a diagram showing an automobile including a camera system. An automobile 500 includes multiple camera modules 402. Each camera module 402 is coupled to a controller 404 via a bidirectional transmission system 406. For example, the controller 404 processes the multiple camera modules 402 according to a driving state of the automobile 500. For example, in the reverse driving mode, the controller 404 displays an image output from the rear-side camera module 402B on an in-vehicle display 502. Upon selecting an around view monitoring mode when parking, the controller 404 combines the multiple images received from the multiple camera modules 402 so as to generate a composite image, and displays the composite image on the in-vehicle display 502.

Description has been made regarding the present disclosure with reference to the embodiments using specific terms. However, the above-described embodiments show only an aspect of the mechanisms and applications of the present disclosure for exemplary purposes only, and are by no means intended to be interpreted restrictively. Rather, various modifications and various changes in the layout can be made without departing from the spirit and scope of the present disclosure defined in appended claims.

What is claimed is:

1. A camera system comprising:
  a plurality of camera modules, each of which is structured to capture image in response to an assertion of a corresponding frame synchronization signal, to transmit frame data including the captured image and to transmit a transmission synchronization signal which is asserted in synchronization with the transmission of the frame data; and
  a controller structured to control the plurality of camera modules, and to process images captured by the plurality of camera modules,
  wherein the controller is structured:
    (i) to supply a plurality of frame synchronization signals to the plurality of camera modules respectively, wherein the controller asserts each frame synchronization signal at an image capture timing at which the corresponding one of the plurality of camera modules should capture the image;
    (ii) to receive the frame data and a plurality of transmission synchronization signals from the plurality of camera modules respectively;
    (iii) to process the plurality of items of frame data thus received; and
    (iv) for each camera module, to acquire a time difference between an assertion of a corresponding one of the plurality of frame synchronization signals and an assertion of a corresponding one of the plurality of transmission synchronization signals, so as to adjust the timing of the corresponding one of the plurality of frame synchronization signals according to the corresponding time difference.

2. The camera system according to claim 1, wherein the controller comprises:

a plurality of receivers each structured to receive a corresponding frame data and a corresponding one of the plurality of transmission synchronization signals;

an image processing unit structured to process a plurality of items of frame data received by the plurality of receivers;

a synchronization signal generating unit structured to generate the plurality of frame synchronization signals;

a plurality of delay measurement units each structured to acquire a time difference between a corresponding one of the plurality of frame synchronization signals and a corresponding one of the plurality of transmission synchronization signals; and a plurality of transmitters structured to transmit the plurality of frame synchronization signals to the plurality of camera modules respectively, and wherein the plurality of frame synchronization signals have a timing relation that is adjustable based on time differences measured by the plurality of delay measurement units.

3. The camera system according to claim 2, wherein the receiver, the transmitter, and the delay measurement unit that correspond to the same camera module are integrated on a single deserializer circuit.

4. The camera system according to claim 3, wherein the camera module comprises:

an image sensor; and a serializer circuit structured to enable bidirectional communication with the deserializer circuit that forms a pair with the serializer circuit.

5. The camera system according to claim 1, wherein the camera module transmits RAW data to the controller, wherein, upon detecting an occurrence of a transmission error in a subpixel of "G", the controller refers to a value of a subpixel of "G" in an immediately previous line, and wherein, upon detecting an occurrence of a transmission error in a subpixel of "R" or "B", the controller refers to a value of a subpixel of "R" or "B" in a two-lines-previous line.

6. An automobile comprising the camera system according to claim 1.

7. A controller structured to control a plurality of camera modules, each of which is structured to capture image in response to an assertion of a corresponding frame synchronization signal, to transmit frame data including the captured image and to transmit a transmission synchronization signal which is asserted in synchronization with the transmission of the frame data, and to process video images captured by the plurality of camera modules, wherein the controller comprises:

a plurality of receivers each structured to receive the frame data and a transmission synchronization signal that is synchronized with the frame data from a corresponding one of the plurality of camera modules, wherein the transmission synchronization signal is a timing signal;

an image processing unit structured to process a plurality of items of frame data received by the plurality of receivers;

a synchronization signal generating unit structured to generate a plurality of frame synchronization signals that correspond to the plurality of camera modules, wherein the plurality of frame synchronization signals are timing signals, and the controller asserts each frame synchronization signal at an image capture timing at which the corresponding one of the plurality of camera modules should capture the image;

a plurality of delay measurement units each structured to acquire a time difference between an assertion of a corresponding one of the plurality of frame synchronization signals and an assertion of a corresponding transmission synchronization signal; and a plurality of transmitters structured to transmit the plurality of frame synchronization signals to the plurality of camera modules respectively, and wherein the plurality of frame synchronization signals have a timing relation that is adjustable based on time differences measured by the plurality of delay measurement units.

8. The controller according to claim 7, wherein the receiver, the transmitter, and the delay measurement unit that correspond to the same camera module are integrated on a single deserializer circuit.

* * * * *